United States Patent [19]

Kato

[11] Patent Number: 5,289,335

[45] Date of Patent: Feb. 22, 1994

[54] COMPOUND LIGHTNING ARRESTER FOR LOW VOLTAGE CIRCUIT

[75] Inventor: Giichiro Kato, Tokyo, Japan

[73] Assignee: Central Lightning Protection Co. Ltd., Tokyo, Japan

[21] Appl. No.: 891,638

[22] Filed: May 29, 1992

Related U.S. Application Data

[63] Continuation-in-part of Ser. No. 465,413, Jan. 16, 1990, abandoned.

[30] Foreign Application Priority Data

Jan. 21, 1989 [JP] Japan ................................. 1-12991

[51] Int. Cl.$^5$ ................................................ H02H 1/04
[52] U.S. Cl. ..................................... 361/117; 361/120; 361/126
[58] Field of Search ............... 361/117, 118, 119, 121, 361/120, 126, 127

[56] References Cited

U.S. PATENT DOCUMENTS

| | | | |
|---|---|---|---|
| 3,727,166 | 4/1973 | Kobayashi | 338/63 |
| 4,152,743 | 5/1979 | Comstock | 361/56 |
| 4,174,530 | 11/1979 | Kresge et al. | 361/127 |
| 4,652,963 | 3/1987 | Fahlen | 361/16 |
| 4,814,936 | 3/1989 | Ozawa et al. | 361/127 |

OTHER PUBLICATIONS

"Contrivance of Low-Voltage Multi-Element Lightning Arrester", Kitagawa et al.

*Primary Examiner*—Steven L. Stephan
*Assistant Examiner*—Ben M. Davidson
*Attorney, Agent, or Firm*—Rodman & Rodman

[57] ABSTRACT

A low voltage arrester works as a lightning arrester with high energy tolerance. With installation of the lightning arrester on power lines, telephone lines or other signal input lines, all electric apparatus connected to the lines are effectively protected against lightning surges including high energy surges caused by close thunderbolts. The lightning arrester includes two elements connected in parallel. One is a series circuit of a zinc oxide arrester and a non-inductive resistor, and the other element is a spark gap formed of brass electrodes. All the arrester elements are installed in one refractory porcelain case. In order to install the arrester in a limited space and to insure tolerance of high energy surges, the non-inductive resistor uses bifilarly or Ayston-Perry wound Nichrome wire.

5 Claims, 4 Drawing Sheets

COMPOUND LIGHTNING ARRESTER FOR LOW VOLTAGE CIRCUIT

This is a continuation-in-part of application Ser. No. 07/465,413 filed Jan. 16, 1990.

FIELD OF THE INVENTION

The present invention relates to a compound lightning arrester for low voltage circuits.

BACKGROUND OF THE INVENTION

In recent years, as a result of automation, many electronic devices are used extensively in various locations in plants, laboratories, offices, hospitals, sporting facilities such as golf courses, and agricultural facilities, etc. These electronic devices are usually vulnerable to surge voltages from lightning.

The surge voltages can enter electronic devices via telephone and other communication lines, as well as via a power source. Therefore, lightning arresters are often needed at both points of entry. Some of the above-mentioned facilities may be located in regions where thunderstorms frequently prevail. Furthermore, when the facilities are located at mountainous regions, dry riverbeds or sand dunes, the resistivity of the facility sites is relatively high. Consequently lightning currents at high resistivity sites will not immediately dissipate in the ground but can travel through adjacent electric power lines to other areas where such currents can cause great damage.

In addition, unmanned, electronically controlled facilities increase in number with the spread of automation. These unmanned facilities require that personnel be dispatched from distant locations when problems occur in the lightning arresters.

Since the demand for lightning arresters is steadily increasing, there is a need for an improved lightning arrester to simplify maintenance requirements and reduce maintenance costs. The improved lightning arrester should be capable of withstanding greater energy surges than known lightning arresters, protect electronic devices from repeated strikes of heavy lightning surges, and also avoid burnout within the lightning arrester itself.

A lightning arrester for high sensitivity of low voltage circuits, in accordance with the present invention, is thus proposed for the above-mentioned purposes, and for extensive application in various fields.

PRIOR ART

The prior art can be categorized into seven major types of lightning arresters as follows:
(1) Spark gap
(2) Gas discharge tube lightning arrester
(3) Semiconductor lightning arrester
(4) Serial circuit of (2) and (3)
(5) Parallel circuit of (2) and (3)
(6) Serial circuit of (1) and (3)
(7) Parallel circuit of (1) and (3)

A spark gap lightning arrester of type (1) can easily absorb high energy surges caused by adjacent or direct thunderbolts. However, the spark gap type lightning arrester has the disadvantage of a distinct delay in starting its spark commencement and cannot be used alone as an effective lightning arrester.

A gas discharge tube lightning arrester of type (2) generally responds quickly to impulsive surges but has small electrostatic capacity. Gas discharge tubes are generally used for telephone and other communication lines. However, when such tubes are used for a power source circuit, there frequently arises a discharge current due to voltage, and this current cannot be cut off immediately after the passage of a surge.

The semiconductor lightning arrester of type (3), hereinafter referred to as a zinc oxide arrester, generally has a high sensitivity in response to lightning surges. However, when surge currents greatly exceeding the maximum allowable peak current ($I_O$) of the lightning arrester are applied intermittently, or for a long duration, deterioration of the zinc oxide arrester element may occur and reduce the voltage at a reference current ($I_C$). The lightning arrester can then be brought into a short circuit condition accidentally only by the impressed voltage of its circuit, and may spontaneously ignite if the circuit power source is not cut off. Lightning arresters with a current rating capable of withstanding large current surges usually have a large electrostatic capacity and are of a large size, and are thus unsuitable for indoor use.

The serial circuit lightning arrester of type (4) is not adaptable to discharge currents even when used in a power source circuit, and has a small electrostatic capacity (which limits operational functions of protective equipment). Another problem is that in cases of lightning strikes that result in continuous discharges with a long duration of current flow or in cases of multiple lightning strikes, fire damage may occur because the serial circuit lightning arrester has an insufficient energy and current rating to withstand the energy generated by such strokes of lightning.

In the parallel circuit lightning arrester of type (5), a high sensitivity and relatively large energy and current rating can be obtained if an appropriate combination of components is found. However, a disadvantage is that its discharge current cannot be absorbed in a power source circuit, and there is no certainty that the parallel circuit lightning arrester, when used in an electronic circuit, can withstand surges of multiple lightning strikes.

The serial circuit lightning arrester of type (6) is not adaptable to discharge currents when used in a power circuit, and does not have the sensitive responsiveness of semiconductors because of the presence of a spark gap, and is thus rarely used.

The parallel circuit lightning arrester of type (7) has elements of different properties connected in parallel and, when a proper combination is obtained, such parallel circuit corrects the disadvantage of each element being used separately. A simple connection of two elements in parallel, however, has some degree of variation in the spark voltage ($V_S$) of the spark gap even if the spark voltage ($V_S$) of the spark gap and the maximum allowable peak voltage ($V_O$) of the zinc oxide arrester coincide. Further, the properties of the zinc oxide arrester are complicated. For example, some degree of variation is found in the element properties and, for these reasons, it is not always easy, at present, to obtain cooperation between the operations of the two, which leads to manufacturing difficulties in mass production.

In addition, a discharge voltage ($V_P$) appears across the spark gap after the current has been diverted to the spark gap and the magnitude of the discharge voltage ($V_P$) is remarkably smaller than the spark voltage ($V_S$) of the spark gap. The discharge voltage ($V_P$) is much lower than the working voltage (V) of the zinc oxide arrester. Therefore, the load on the zinc oxide arrester is sharply decreased and there is no further concern for deterioration of the zinc oxide arrester due to its overloading.

When a lightning surge is converted from a zinc oxide arrester to a spark gap, it is not only important to achieve cooperation between the spark voltage ($V_S$) and the maximum allowable peak voltage ($V_O$) in both the zinc oxide arrester and spark gap, but also to ensure that the maximum allowable peak current ($I_O$) of the zinc oxide arrester is not exceeded until the spark gap starts to function. The resistance of a zinc oxide arrester varies with the current magnitude and furthermore is accompanied with variations in the properties of the spark gap and the zinc oxide arrester element. Consequently it is extremely difficult to achieve operational cooperation in a mass production device. The resulting products often have thermal breakdowns in the zinc oxide arrester before the spark gaps start to function.

SUMMARY OF THE INVENTION

There are many examples of low voltage lightning arrester systems in which elements of different characteristics are connected in parallel. One representative example is a zinc oxide arrester used as a first element and a spark gap used as a second element. If the surge voltage due to a lightning strike exceeds the energy tolerance of the first element, the spark gap of the second element is bridged by a spark and backs up the first element. Thus, the first element does not fail and the instruments and/or equipment are protected.

However, there are obstacles to the manufacture and long-term use of this type of low voltage arrester system. One problem is how to minimize the effect of irregularity and variation of the spark voltage ($V_S$) of the spark gap during long time periods such as a year. A similar problem also exists in dealing with the zinc oxide arrester.

The present invention provides a comparatively simple and reliable construction to obviate the above-mentioned drawbacks. Further, mechanical construction of high accuracy components, which are not suitable for mass production, is not required.

The present invention is a low voltage lightning arrester which connects a zinc oxide arrester and spark gap in parallel to form a unit. In connecting the above two elements in parallel, a non-inductive resistance is connected in series with the zinc oxide arrester to achieve cooperative performance between the zinc oxide arrester and the spark gap. All the elements are installed in one refractory porcelain case.

The spark voltage ($V_S$) of the spark gap coincides approximately with the maximum allowable peak voltage ($V_O$) of the zinc oxide arrester. In addition, the non-inductive resistor has a resistance value ($R_A$) more than or equivalent to the value given by dividing the difference between the spark voltage ($V_S$) of the spark gap and the working voltage (V) of the zinc oxide arrester by a current equivalent to the maximum allowable peak current ($I_O$) of the zinc oxide arrester. This relationship can be expressed as $$R_A \geq \frac{(V_S - V)}{I_O}.$$

The non-inductive resistor also has a joule rating that exceeds the magnitude of the product of voltage times the maximum allowable peak current ($I_O$) impulse of the zinc oxide arrester.

Similarly, in accordance with the present invention, a non-inductive resistor (R) can be inserted in a lightning arrester combining a gas discharge tube and spark gap electrodes. The non-inductive resistor (R) has a resistance value more than or equivalent to the value obtained by dividing the difference between the discharge starting voltage of the spark gap and the discharge voltage (discharge maintaining voltage) of the gas discharge tube with a current value (I) equivalent to the surge current rating of the gas discharge tube. The non-inductive resistor (R) also has a joule rating that exceeds the product of voltage times the magnitude of the current rating (I) impulse of the gas discharge tube.

However, in any of the above-mentioned cases, it is essential to provide a non-inductive resistor to benefit from the properties of the zinc oxide arrester absorber (or gas discharge tube).

In order to install into limited space and to secure large tolerance energy, the non-inductive resistor uses bifilarly or Ayston-Perry wound Nichrome wire.

The low voltage arrester of the present invention, thus composed, works as a lightning arrester with a sufficient level of high energy tolerance. By installing the lightning arrester on power lines, telephone lines or other signal input lines, all electric apparatus connected to the lines are effectively protected against lightning surges, including the high energy surges caused by close thunderbolts.

BRIEF DESCRIPTION OF THE DRAWINGS

The accompanying drawings show an embodiment of the compound lightning arrester for a low voltage circuit in accordance with the present invention wherein.

THE OPERATIONAL PRINCIPLE OF THE INVENTION

A zinc oxide arrester functions as an insulator for voltage magnitudes under its working voltage (V). For voltage magnitudes above its working voltage, the zinc oxide arrester functions as a non-linear resistor, whose resistance increases proportionally in an amount approximately 15 to 30 times the voltage. Therefore, the zinc oxide arrester has a fast response to impulse voltages and does not have time delay problems. An overvoltage arising from ignition delay that is characteristic of a spark gap can be theoretically eliminated by connecting an appropriate zinc oxide arrester to the spark electrodes in parallel and further by approximately equalizing the maximum allowable peak voltage ($V_O$) of the zinc oxide arrester with the spark voltage ($V_S$) of the spark gap. However, just before breakdown, the zinc oxide arrester approaches its maximum allowable peak voltage ($V_O$) and the value of its internal resistance becomes unstable. Further variations exist in the characteristics of zinc oxide arresters and spark gaps. Therefore it is a difficult problem, in mass production, to ensure cooperation between each element without any breakdown.

However, these disadvantages can be corrected by connecting in parallel a surge absorber and a non-inductive resistor with the above-mentioned characteristics.

Figure 1:
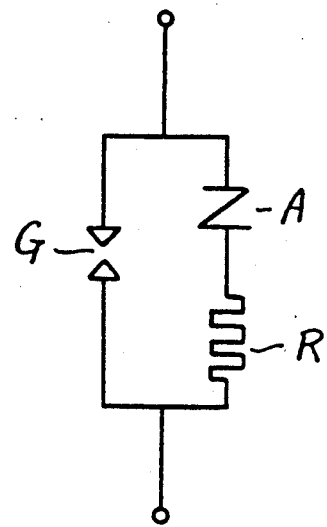
FIG. 1 is a schematic drawing of the connection principle.
Figure 2A:
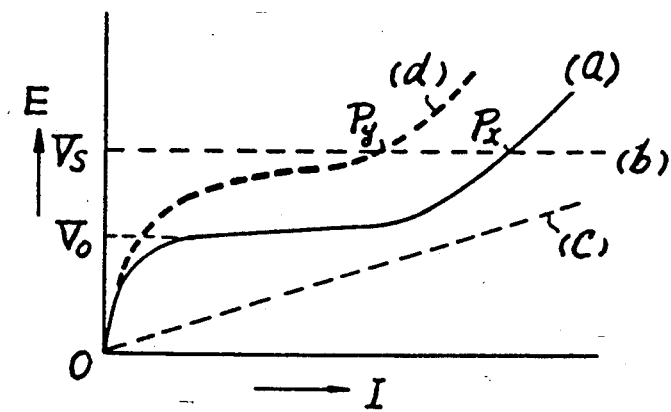
FIGS. 2A, 2B and 2C are graphs describing operational principles of the invention.

FIG. 1 shows a compound low voltage lightning arrester wherein a spark gap (G) is connected to a serial combination of a zinc oxide arrester (A) and a non-inductive resistor (R). When the energy tolerance of the zinc oxide arrester (A) and the spark gap (G) are compared, it will be noted that the zinc oxide arrester (A) is relatively sensitive and has a small energy tolerance ($E_Z$), while the spark gap (G) is relatively insensitive and has a large energy tolerance ($E_G$). Thus, the zinc oxide arrester (A) and the spark gap (G) have properties contrary to each other. Therefore, the zinc oxide arrester generally reaches thermal breakdown just before the spark electrodes start to discharge. In the absence of the non-inductive resistor or the presence only of the zinc oxide arrester, the voltage-current curve becomes non-linear as shown in FIG. 2A. Therefore, when the spark voltage ($V_S$) of the spark gap (G) is located at the position shown by the broken line (b), the action of the spark gap (G) occurs at the point (Px) just before the energy tolerance ($E_Z$) of the zinc oxide arrester (A) is exceeded. Consequently, it is difficult to provide a cooperative action between the zinc oxide arrester (A) and the spark gap (G) because the zinc oxide arrester (A) reaches thermal breakdown before a discharge begins across the spark gap (G). When the non-inductive resistor (R) is connected in series with the zinc oxide arrester (A), the voltage-current curve of the non-inductive resistor (R) becomes a line as shown by the fine dotted line (c) with a predetermined ratio or slope irrespective of the waveform of increasing surge current.

When the zinc oxide arrester (A) and the non-inductive resistor (R) are connected in series, the resulting voltage-current curve becomes the sum of the potentials of both, or is shown as a thicker dotted line (d). Further, the energy of the surge is also distributed to the non-inductive resistor (R) and the zinc oxide arrester (A). Therefore the current can be converted from the zinc oxide arrester (A) to the spark gap (G) without applying any unreasonable burden on the zinc oxide arrester. In this case, the relationship of the spark voltage ($V_S$) of the spark gap (G), the resistance ($R_A$) of the non-inductive resistor (R), the working voltage (V), and maximum allowable peak current ($I_O$) of the zinc oxide arrester (A) can be expressed as $$V_S \leq (R_A \times I_O + V)$$

(In this invention, the inductance component of the resistor need not be considered as a non-inductive resistor is used. Therefore the calculation is simple.)

A compound low voltage lightning arrester having a circuit as shown in FIG. 1 conforms to the previous expression for voltage $V_S$ of the spark gap (G) when a non-inductive resistor (R) of predetermined value (bifilar Ayston-Perry winding) is connected to the zinc oxide arrester (A). The switching from the zinc oxide arrester (A) to the spark gap (G) is transferred from Px to Py or into the safety zone as shown in FIG. 2A. Therefore, even when high energy lightning surges strike the arrester repeatedly, the zinc oxide arrester (A) will not break down. As a result, the arrester can protect the object requiring protection and will not break down or fail because of such high energy surges.

Figure 2B:
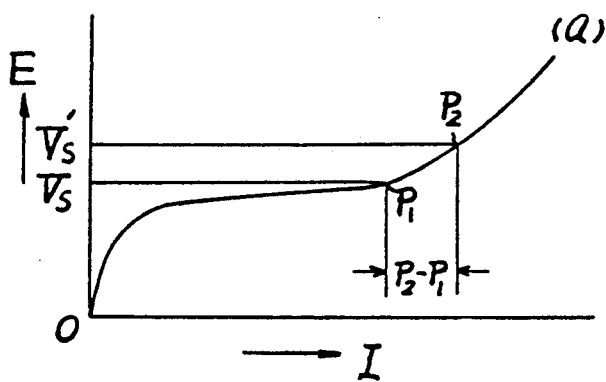

Referring to FIG. 2B of the drawings, (a) represents the characteristics of a surge absorber where the switching at the point $P_1$, to a spark gap is desired. If the point $P_1$ of the switching is transferred to the point $P_2$, the surge absorber would be overloaded and result in breakdown.

On the other hand, since the spark voltages ($V_S$) of spark gaps have essentially some variation, various values of spark voltage may result, and then the switching will occur at the point $P_2$, leading to the previously described problems. Zinc oxide arresters also have similar variation in break-down voltage, and this may be considered a relative problem. Thus some variation of the spark gap properties can be assumed for discussion purposes.

Figure 2C:
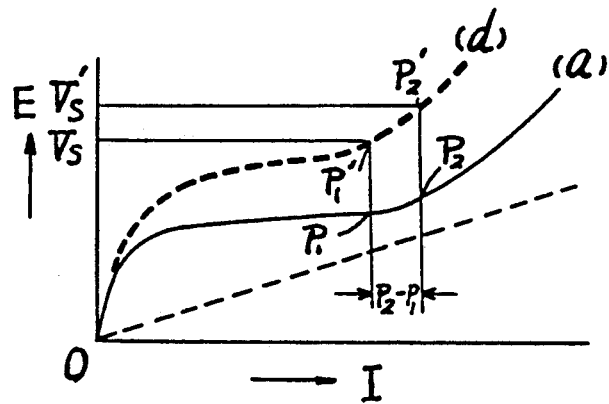

FIG. 2C shows an example where a resistor (R) is used. When the starting voltage ($V_S$) of the gap is increased to a spark value, the discharge starting point of the spark gap will move to the point $P'_2$, which corresponds to the point $P_2$ on the characteristic curve (a). Thus the quantity of overloading ($P_2-P_1$) will be greatly reduced compared to the characteristic of FIG. 2B.

One reason for use of a non-inductive resistor in this case is that the serial connection of the resistor and zinc oxide arrester makes the flat section of the curves smaller, as can be seen from the comparison of both curves (a) and (d) in FIG. 2A. This is an undesirable tendency, when viewed simply as a lightning arrester, because it causes an increase in the working voltage (V). The purpose of the present invention is to emphasize the advantage of making the discharge certain at the spark gap. Therefore, excessive inductance components included in the resistor are avoided, and thus the effect as a lightning arrester is retained. This is a primary reason for the use of a non-inductive resistor. A second reason for use of a non-inductive resistor is that the inductance increases, especially in a wire wound resistor, because of abrupt upward current surges. On the other hand, a smaller size resistor is required as a component of a lightning arrester, though a large diameter and a long length of resistance wire will provide a resistor with a large current capacity. Therefore, a wire wound resistor must be selected in a lightning arrester, and thus, a wire wound resistor, particularly a bifilar or Ayston-Perry winding, is required for the purpose of the invention.

Under this arrangement, a reliable switching is realized from the surge absorber to the spark gap. Since a spark electrode with a large current capacity can be easily designed, the zinc oxide arrester can be prevented from burnout by overloading in cases of a considerably large current surge or multiple lightning strokes only if the zinc oxide arrester has a joule rating sufficient for a short operation time just before the spark gap ignition.

In a similar manner, a combination of a gas discharge tube and a spark gap can switch a lightning surge to the spark gap without any burn damage of the gas discharge tube only if a resistor of the above-mentioned properties is connected to the gas discharge tube.

For further reference, an embodiment of the invention will be described to clarify an aspect of the effectiveness accomplished by connecting a non-inductive resistance (R) to the surge absorber.

DETAILED DESCRIPTION OF THE PREFERRED EMBODIMENT

An embodiment of the compound low voltage lightning arrester in accordance with the present invention will be described below in reference to the accompanying drawings.

Figure 3:
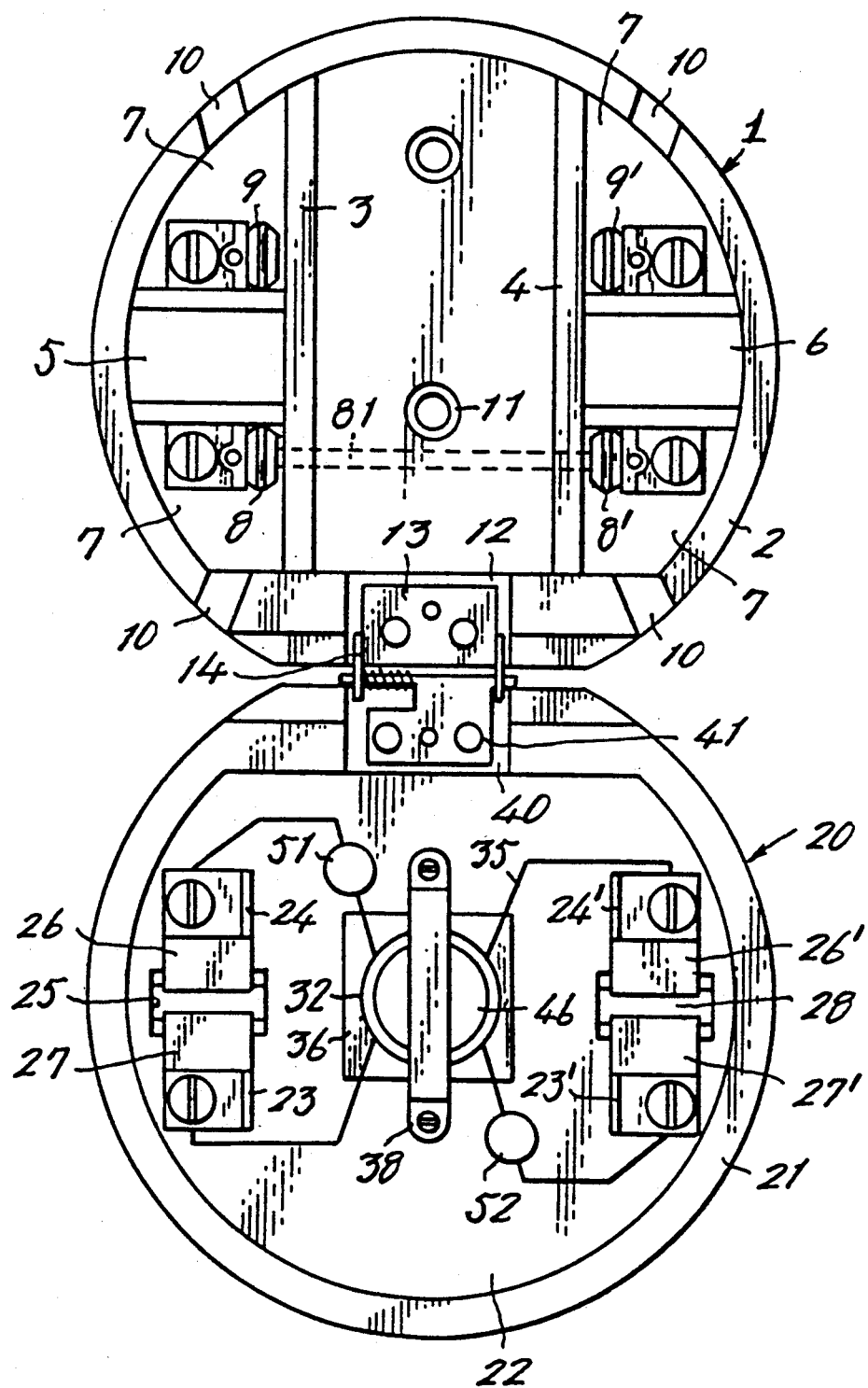
FIG. 3 is a plan view of the lightning arrester with the cover opened.

FIG. 3 shows the lightning arrester with its cover opened. An approximately cylindrical receptacle 1 has a peripheral projecting rim 2 and is provided with partition plates 3 and 4 at the inside and also with reinforcements 5 and 6 to form recessed chambers 7 at four places. The receptacle 1 can be formed of refractory porcelain. The recessed chambers 7 have two pairs of clipping electrodes 8, 8' and 9, 9' standing upright. The clipping electrodes 8 and 8' are connected to a bar 81 disposed on the back side of the receptacle 1, and are connected to grounding wire.

Figure 5:
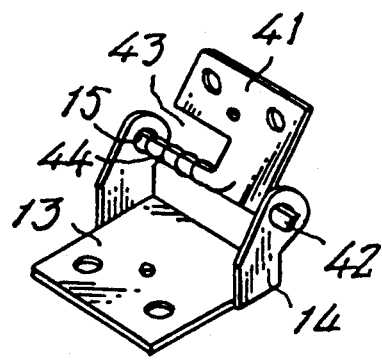
FIG. 5 is a perspective view of a metal pivot piece and a metal connector piece.

The rim 2 includes radially spaced cut slots 10 for wiring provided at the top and bottom portion of the upright rim 2 as shown in FIG. 3. Mounting holes 11, for securement to a wall, are provided in the receptacle 1. A recessed groove 12 is provided at the inside bottom portion of the receptacle 1, and a metal pivot piece 13 is disposed in the recessed groove 12. The metal pivot piece 13 has spaced bearing arms 14, 14 bent to an upright position at the left and right sides of the pivot piece 13 as shown in FIG. 5. The bearing arms 14, 14 are provided with bearing holes 15, 15.

Figure 6:
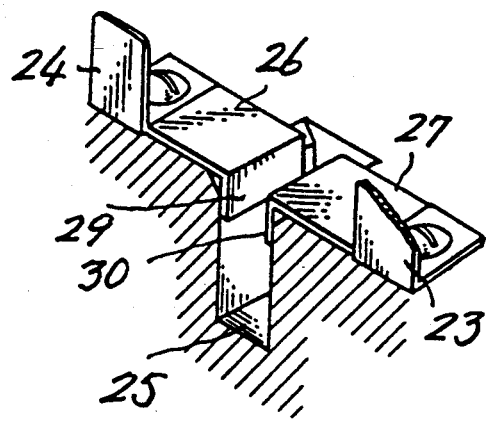
FIG. 6 is a partial sectional perspective view of a spark gap.

Reference number 20 indicates a cover of the receptacle 1, which is made of the same porcelain as the receptacle 1. The cover 20 includes a peripheral, recessed ledge 21 that defines a projecting surface 22 on the cover 20. Two pairs of edging electrodes 23, 23' and 24, 24' face each other and are fitted into the clipping electrodes 8, 8' and 9, 9' when the cover 20 is closed. The edging electrodes 23, 23' and 24, 24' are set on grooves 25, 25 in a spaced relationship. Brass electrodes 26, 26' and 27, 27' of the edging electrodes 23, 23' and 24, 24' are set to face each other and define spark gaps 28, 28. The brass electrodes 26, 26' and 27, 27' are bent with a right angle at one end (FIG. 6) to form bent pieces such as 29 and 30 inserted in the groove 25. The brass electrodes 26, 26' and 27, 27' are connected in parallel with zinc oxide arrester elements 31 and 32. The zinc oxide arrester elements 31 and 32 are connected respectively to the edging electrodes 23, 23' and 24, 24' with lead wires 35, 35 and are disposed at the center on the back side of the cover 20. To save space, two pieces of the zinc oxide arrester elements 31 and 32 are stacked, being separated by a mica insulator 36. The stacked zinc oxide arrester elements 31 and 32 are secured to the cover 20 by a band 38 fixed at opposite ends by screws 37. On the cover 20, the zinc oxide arrester elements 31 and 32 are connected in series to non-inductive resisters 51 and 52.

A recessed groove 40 is provided at the top of the cover 20, as shown in FIG. 3, to receive the metal connector piece 41 for securance.

The metal connector piece 41 is provided at its ends with protruding tips 42 42 to be inserted for pivotal connection into the bearing holes 15, 15 of the metal pivot piece 13. The connector piece 41 includes a notch 43 proximate one protruding tip 42 to permit easy detachment from the bearing holes 15, and a spring 44 is provided on one of the protruding tips 42.

Figure 4:
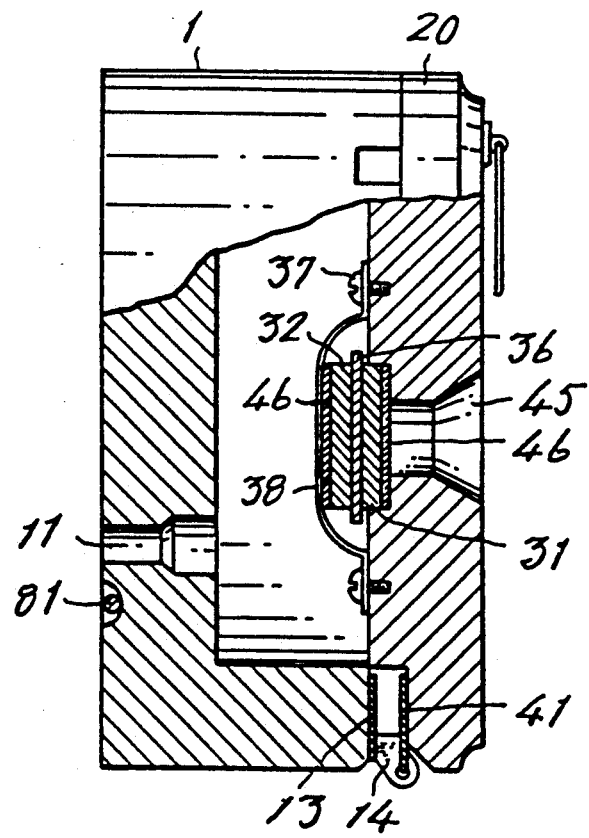
FIG. 4 is a side view thereof, partly shown in section, with the cover closed.

When the protruding tips 42, 42 have been inserted into the bearing holes 15, 15, the cover 20 is connected to the receptacle 1 by the connector piece 41 and the pivot piece 13 so that the cover 20 and receptacle 1 may be easily pivoted to open and closed positions as shown in FIGS. 3 and 4.

By moving the metal connector piece 41 to the left as shown in FIG. 5, and by drawing out the shorter protruding tip 42, the connector piece 41 is easily detached, enabling the receptacle 1 to be separated from the cover 20.

A peep hole 45 is provided in the receptacle 1 to inspect the zinc oxide arrester elements 31 and 32 when the receptacle 1 and the cover 20 are in a closed position.

As most clearly shown in FIG. 4, a non-reversible thermosensitive label 46 can be seen through the peep hole 45 of the cover 20. The thermosensitive label 46 is applied on the surface of the zinc oxide arresters 31 and 32. Thus, as shown in FIG. 4, one of the labels 46 can be seen through the peep hole 45.

The other thermosensitive label 46 is applied on the zinc oxide arrester 32 so as to be seen on opening the cover 20.

The thermosensitive label 46, sensing the temperature rise of the zinc oxide arresters 31, 32, changes its color from white to red and the integral part can be inspected by viewing the color from the outside of the peep hole 45.

Figure 7:
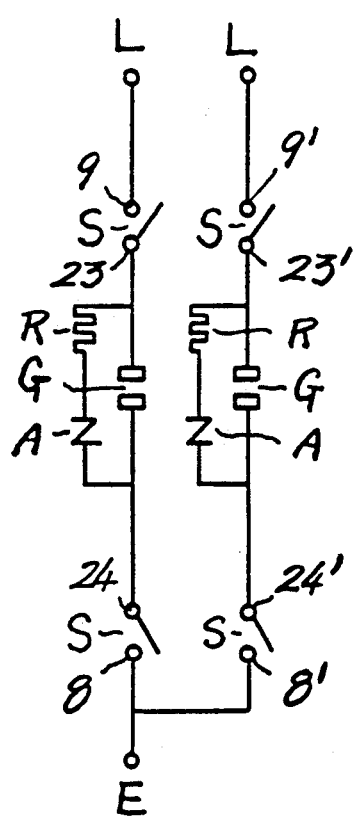
FIG. 7 is an example of the circuit diagram of a lightning arrester of the present invention.

Referring to FIG. 7, the operating circuit for the compound low voltage lightning arrester includes a power source side terminal L and an earth side terminal E. The circuit of FIG. 7 is disconnected or connected by four switches S, that are moved respectively by opening or closing the cover 20.

Figure 8A:
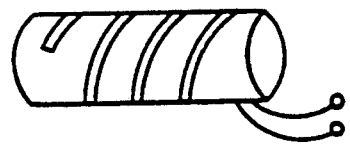
FIGS. 8a and 8b are perspective and plan views of alternate embodiments of a non-inductive resistor of the lightning arrester.
Figure 8B:

The resistors R, R are non-inductive resistors with Nichrome wires wound as a bifilar winding as shown in FIG. 8a. Ayston-Perry winding of Nichrome wires is also used as shown in FIG. 8(b).

A compound low voltage lightning arrester of the invention with a preset spark gap (G) and a surge absorber (A) (or gas discharge tube (B)) and non-inductive resistor (R) are connected in series, and can be operated more sensitively and easily than in cases where known lightning arrester elements are used separately or in a previously known combination. The lightning arrester of the present invention can prevent the subject of protection from burning damage even against multiple lightning strikes, since the lightning arrester of the present invention will not be damaged by burning even when struck by considerably high surge voltages.

Generally, in most cases of multiple lightning strokes, the first stroke causes breakdown of the lightning arrester and the second stroke causes damage to the subjects being protected by the lightning arrester.

While lightning arresters are used in steadily increasing numbers, their damage by lightning strokes have been considered inevitable according to prior design philosophies, provided that the subject of their protection has been protected. Repair and replacement of damaged lightning arresters involves much labor for maintenance and is not economical. The lightning arrester of the invention therefore can offer an outstanding contribution to the art and is also labor saving.

What is claimed is:

1. A lightning arrester for protecting low voltage electrical apparatus from high energy electrical surges caused by lightning comprising,
   a single housing,
   a zinc oxide arrester,
   a non-inductive resistor connected in series circuit with said zinc oxide arrester,
   a single spark gap for receiving full voltage of the electrical surges, said spark gap being connected in parallel with said series circuit of arrester and resistor to secure cooperation between said zinc oxide arrester and said spark gap,
   said zinc oxide arrester, said spark gap and said non-inductive resistor being installed in said single housing,
   said resistor having a value $R_A$ in ohms where:

$$R_A \geq \frac{(V_S - V)}{I_0},$$

and $V_S$ is the spark voltage of the spark gap, $V$ is the working voltage of the zinc oxide arrester, $I_O$ is the maximum allowable peak current of the zinc oxide arrester, and said resistor is a bifilarly of Ayston-Perry wound Nichrome wire having a current capacity larger than the maximum allowable peak current $I_O$ of said zinc oxide arrester, said non-inductive resistor inhibiting an increase of the working voltage for an assured discharge of the spark gap.

2. The lightning arrester as claimed in claim 1 wherein said single housing is made of porcelain.

3. An electrical surge protector comprising:
   a housing of electrically insulating material, said housing having a first electrically conducting terminal and a second electrically conducting terminal;
   a spark gap disposed in said housing and connected directly between said first terminal and said second terminal for receiving full voltage of an electrical surge;
   arrester means and a noninductive resistor disposed in said housing and connected in series between said first terminal and said second terminal;
   wherein said resistor has a value $R_A$ in ohms with $R_A I_O \leq V_S - V_W$ wherein $V_S$ is the spark voltage of the spark gap, $V_W$ is the working voltage of the arrester means, and $I_O$ is the maximum allowable peak current of the arrester means; and
   said resistor is a bifilarly or Ayston-Perry wound Nichrome wire having a current capacity larger than the maximum allowable peak current $I_O$ of said zinc oxide arrester, said non-inductive resistor inhibiting an increase of the working voltage for an assured discharge of the spark gap.

4. A surge protector according to claim 3 wherein said arrester means is a zinc oxide arrester.

5. A surge protector according to claim 3 wherein said arrester means is a gas discharge tube.

* * * * *